US012561104B2

(12) United States Patent
Filali Ansary et al.

(10) Patent No.: US 12,561,104 B2
(45) Date of Patent: Feb. 24, 2026

(54) METHOD FOR CONTROLLING AN ELECTRONIC SHELF LABEL

(71) Applicant: VusionGroup SA, Nanterre (FR)

(72) Inventors: Tarik Filali Ansary, Nanterre (FR); Andreas Rössl, Nanterre (FR); Steven Thomas, Nanterre (FR)

(73) Assignee: VusionGroup SA, Nanterre (FR)

( * ) Notice: Subject to any disclaimer, the term of this patent is extended or adjusted under 35 U.S.C. 154(b) by 0 days.

(21) Appl. No.: 18/709,872

(22) PCT Filed: Dec. 16, 2021

(86) PCT No.: PCT/EP2021/086144
§ 371 (c)(1),
(2) Date: May 14, 2024

(87) PCT Pub. No.: WO2023/110100
PCT Pub. Date: Jun. 22, 2023

(65) Prior Publication Data
US 2025/0013416 A1 Jan. 9, 2025

(51) Int. Cl.
*G06F 3/14* (2006.01)
*G06F 3/147* (2006.01)
*G09F 3/20* (2006.01)

(52) U.S. Cl.
CPC ............ *G06F 3/1431* (2013.01); *G06F 3/147* (2013.01); *G09F 3/204* (2013.01); *G09F 3/208* (2013.01)

(58) Field of Classification Search
None
See application file for complete search history.

(56) References Cited

U.S. PATENT DOCUMENTS

| | | | |
|---|---|---|---|
| 5,374,815 | A | 12/1994 | Waterhouse et al. |
| 2009/0179825 | A1 | 7/2009 | Enarvi et al. |
| 2014/0101000 | A1 | 4/2014 | Falls et al. |
| 2021/0173603 | A1 | 6/2021 | Collet et al. |

FOREIGN PATENT DOCUMENTS

| | | |
|---|---|---|
| JP | H04-303294 A | 10/1992 |
| JP | 2008-529698 A | 8/2008 |
| JP | 2013-183929 A | 9/2013 |
| WO | 2016/052379 A1 | 4/2016 |
| WO | 2019/087792 A1 | 5/2019 |

OTHER PUBLICATIONS

International Search Report issued in PCT/EP2021/086144; mailed Aug. 18, 2022.
"Notice of Reasons for Refusal" Office Action issued in JP 2024-529143; mailed by the Japanese Patent Office on Nov. 5, 2025.

*Primary Examiner* — Nicholas J Lee
(74) *Attorney, Agent, or Firm* — Studebaker Brackett PLLC

(57) ABSTRACT

A method of controlling an electronic shelf label that is attached to a shelf rail at a position along the shelf rail and controlled by a local rail controller at the shelf rail, wherein the rail controller stores a list of display data, wherein an element of the list of display data is intended to be submitted to an electronic shelf label and represents the information that shall be displayed there, and detects the attachment of an electronic shelf label to the shelf rail or the removal of an electronic shelf label from the shelf rail, and triggers an action based on the detection of the attachment or the detection of the removal of an electronic shelf label under consideration of the list of display data.

18 Claims, 4 Drawing Sheets

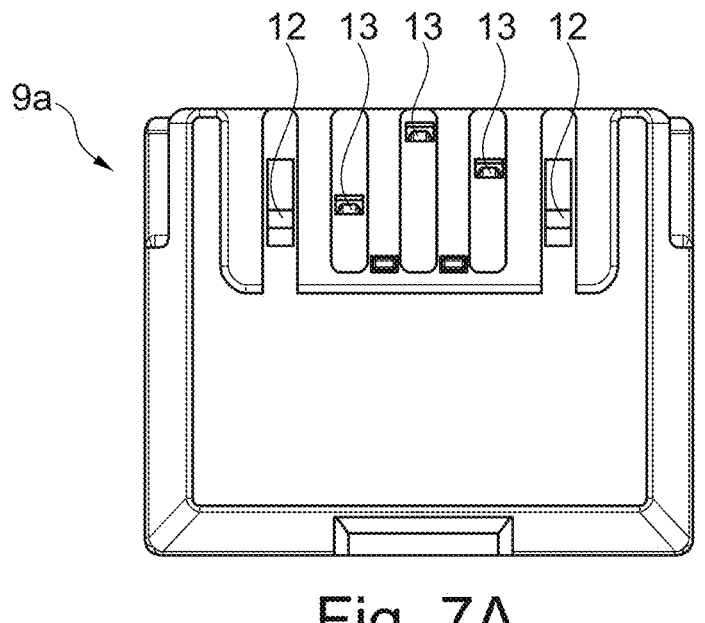
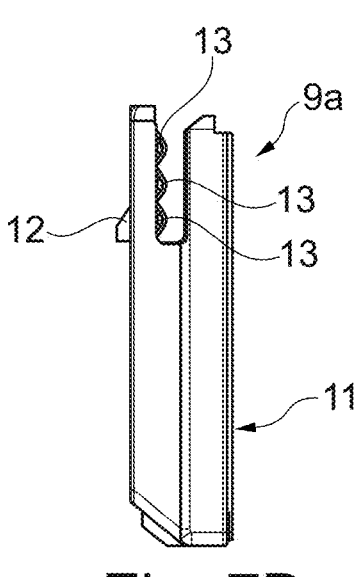
Fig. 7A
Fig. 7B
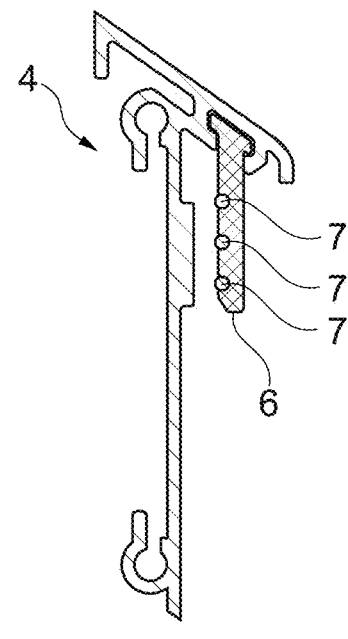
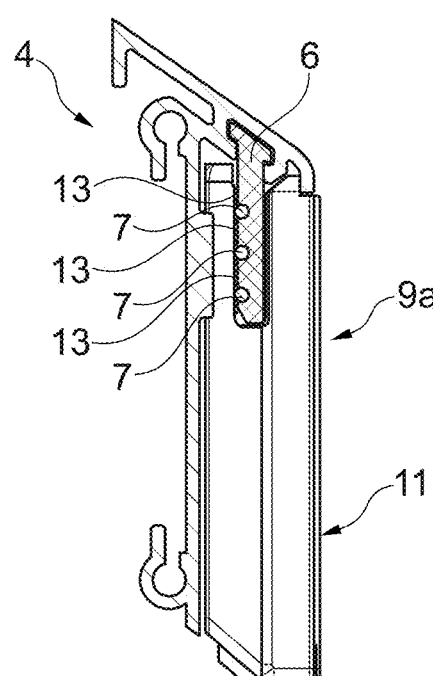
Fig. 8A
Fig. 8B

METHOD FOR CONTROLLING AN ELECTRONIC SHELF LABEL

TECHNICAL FIELD

The invention relates to a method of controlling an electronic shelf label that is attached to a shelf rail at a position along the shelf rail and controlled by a local rail controller at the shelf rail.

Background

In modern business premises it is common to display product and price information with electronic shelf labels (ESLs for short). Changes in the store's range of products as well as the optimization of the store's existing range lead to frequent changes in the arrangement of products and the ESLs on the shelfs. With known ESL systems, manual initiation of the ESLs and assignment of the ESLs to products is necessary after such changes. The same goes for newly installed ESLS.

Such an initialization is about preparing the ESLs to display the correct information. Essentially, this involves providing the correct information so that the ESL can display the information about an associated product placed close to the ESL.

Such a manual initialization of the system is very time-consuming. Because of the manual activity the personnel costs scale with the number of ESLs in the business premises.

In addition to the manual initialization, the manual matching of the ESLs with products or the manual loading of the ESLs with product and price information as well as finding the respective ESLs causes enormous expenditure of time and personnel.

Therefore, the object of the invention is to provide a method in which the aforementioned problems are overcome.

SUMMARY OF THE INVENTION

This object is achieved by a method according to claim 1. Therefore, the subject matter of the invention is a method of controlling an electronic shelf label that is attached to a shelf rail at a position along the shelf rail and controlled by a local rail controller at the shelf rail, wherein the rail controller stores a list of display data, wherein an element of the list of display data is intended to be submitted to an electronic shelf label and represents the information that shall be displayed there, and detects the attachment of an electronic shelf label to the shelf rail or the removal of an electronic shelf label from the shelf rail, and, based on the detection of the attachment or the detection of the removal of an electronic shelf label, triggers an action under consideration of the list of display data.

The measures according to the invention provide the advantage that changes in the equipping of a shelf rail with electronic shelf labels is automatically and autonomously detected in the local shelf rail system, which basically comprises the shelf rail itself and the local rail controller that is attached to the shelf rail. As the shelf rail controller holds the entire set of information (represented by the list of display data) which shall be displayed by the electronic shelf label(s) attached to the shelf rail, the rail controller can now autonomously decide about a required action in its processing, which is triggered by the installation of a new ESL on its shelf rail or by the removal of an ESL from its shelf rail.

The language "its shelf rail" shall mean the shelf rail to which the rail controller is attached or where the rail controller is hosted and where the rail controller controls ESLs after their attachment.

Each element of the list of display data (herein termed list-element) represents the information, preferably product-and/or price-information, that shall be displayed by one individual ESL for a particular product, which is assumed to be placed or already put in place at the shelf floor to which the shelf rail is attached. The list-elements may also comprise other information, for example appearance control information, which is used to control the appearance of the content displayed by the ESLs and so on.

The list of display data may also reflect the order in which the products shall be located on the shelf floor along the shelf rail. The order may also be determined by another data structure associated with the list-elements and stored by the rail controller.

The list of display data is in fact a subset of the planogram, which defines positions of products in the entire shop. This subset describes a "local planogram" for the respective shelf floor. This local planogram, which is stored by the rail controller and which provides inherent knowledge about the product placement on the respective shelf floor, provides the basis for all actions taken by the rail controller with the aim to automatically display the respective information with the appropriate ESLs attached to the shelf rail.

In the context of said action, it should be noted that several actions can be triggered and/or carried out sequentially or simultaneously. These actions by the rail controller are now dealt with in the following in details.

Further particularly advantageous embodiments and extensions of the invention arise from the dependent claims and the following description.

According to one aspect of the invention the rail controller acquires identification data from each electronic shelf label for which the rail controller detected the attachment and stores the acquired identification data. In this way, a list of the ESLs currently attached to the shelf rail can be created, modified or extended by the local rail controller, with the identification data being stored in the list. This list also represents the number of ESLs which were already newly attached to the rail when compared with earlier entries into this list of ESLs. If no ESL is attached to the respective shelf rail, the list of the ESLs is empty.

According to another aspect of the invention the rail controller also deletes the stored identification data for that electronic shelf label for which the removal was detected. In this way the list of the ESLs is modified automatically as soon as the removal of the ESLs is detected by the rail controller. A removal of an ESLs courses the number of list elements to be reduced.

The list of the ESLs is therefore a dynamic list that lists all ESLs attached to the shelf rail at a certain moment. If all ESLs were removed, the list of ESLs will finally be empty, after this situation is detected by the rail controller.

In summary the entries in this dynamic list are automatically adjusted by the local rail controller when a new ESL is attached to the shelf rail or when an ESL is removed from the shelf rail.

In both situations the detection of the attachment or removal of the ESL can be performed digitally by the rail controller, which queries identification data of the ESLs continuously or at sufficiently short intervals. To adapt the list of ESLs, this list is run through, and each element is checked to see whether the corresponding ESL is still available on the rail or has been removed. If the identification data of an ESL is no longer recognized, either once or over a certain period, this element is deleted from the list.

However, to be more energy efficient, the rail controller can be triggered to poll the identification data by a trigger-signal that is generated when the ESL is removed from the rail or when it is attached to the rail. This trigger-signal can be recognized by the rail controller and initiate the execution of a software routine that queries the identification data. The execution of the software routine is for example started when the trigger-signal is received at an interrupt input of a microcontroller or microprocessor of the rail controller.

Dependent on the technical design that realizes the physical signal-interaction between the ESLs and the rail controller, the trigger-signal can be generated when a state of capacitive coupling, inductive coupling or wire-based coupling between the ESL and the rail controller is changed. This change of the state of coupling influences an electronic circuitry at the rail controller. This change in in the state causes to generate (for example by an electronic detection circuited) or directly generates the trigger-signal.

In practice, it has been shown that when equipping the shelves or the shelf rails with the ESL, errors often occur because too few or too many ESL are attached to the shelf rail, i.e. because the wrong number of ESLs is placed on the shelf rail. It has therefore proven to be advantageous to check whether the correct number of ESLs are on the shelf rail. Such a check is preferably carried out automatically based on the stored list of display data and the detection of the attachment or removal of the ESLs on the shelf rail, particularly preferably with the (dynamic) list of ESLs that was created based on the detection of the attachment or removal of the ESLs. This automatic check can form the action here.

Based on the dynamic list of ESLs the rail controller can easily check if a 1:1 relation between the recognized ESLs (the attached ESLs) and the elements of the list of display data exists. However, it has been found to be particularly advantageous if elements are counted in at least one of the lists, preferably in both lists, i.e. in the list of ESLs and in the list of display data.

It is therefore of advantage that based on the detected attachment or detected removal a discrepancy between the number of electronic shelf labels that are attached to the shelf rail and the number of list-elements of the list of display data is identified.

This detected discrepancy allows particular actions to be triggered even before the ESLs are loaded with the respective list-element from the list of display data. Such particular actions can be performed in both scenarios, meaning if the number of attached ESLs is too low or if the number of ESLs is too high when compared with the number of list-elements.

Therefore, it is especially beneficial when the rail controller controls the timing and/or content of the information that is displayed by the electronic shelf label in dependency of the existence or absence of the discrepancy. Such timing and/or content is discussed in the following.

According to a preferred embodiment, the rail controller controls all attached electronic shelf labels to display the information represented by the assigned list-element of the list of display data only after the discrepancy has been resolved, as the action. The ESLs are only supplied with display data when the correct number of ESLs are available on the shelf rail.

This solution provides the advantage that an employee who equips the shelf rail with ESLs can see immediately when the correct number of ESLs has been reached because the ESLs receive the data and subsequently display the corresponding list-elements of the list of display data. The employee only must attach ESLs to the shelf rail until all the ESLs display the corresponding, expected information. The employee no longer must concentrate on whether he/she has overlooked to place an ESL on the rail, as is the case with existing systems. Instead, the employee can concentrate on the exact placement (positioning) of the ESLs relative to the associated products. This measure therefore allows the ESL to be attached to the shelf rail more quickly and at the same time more precisely.

This measure also provides the advantage that too early and therefore faulty assignment and transmission of the display data to the ESLs is avoided, which would otherwise have to be corrected by multiple display data transmissions, which in turn would lead to increased energy consumption in the system and may also cause confusion at the employee's side when watching the ESLs on the shelf rail.

Furthermore, according to a further aspect of the invention the rail controller generates as the action a supporting signal or supporting data representing a supporting information in dependence on the identified discrepancy. This measure allows direct or indirect interaction with the user, which typically would be the employee who manages the attaching or removal of the ESLs at the rail.

Such supporting signal may be a human understandable signal, such as a sound-signal or a light-signal. However, it can also be a (light/radio) signal that another unit or device (for example a personal digital assistant (PDA) such as a mobile phone or a tablet computer) must interpret in order to make it understandable for the employee.

Preferably, the rail controller comprises a light emitting element, in particular a light-emitting diode (LED), and controls the light emittance in dependency on the supporting signal or supporting data.

The light emitting element can be used to transmit information to a further unit or device, in particular a camera. The camara may capture the light signal and supplies a digital representation of it (by a radio signal) to another unit or device (for example the PDA), where it is evaluated, and its content or meaning is made available for the employee.

However, the light emitting element is preferably used to directly inform the employee about the current status of the rail controller or the shelf rail without any intermediate equipment. Therefore, the light signaling is defined upfront and known to the employee. For example, the light emitted by the light emitting element can flash as long as the wrong number of ESLs are attached to the shelf rail. If the right number of ESLs is on the shelf rail, the light emitting element can, for example, light up continuously or alternatively not light up and not flash. It is also possible that the light emitted by the light emitting element flashes differently and/or lights up in different colors depending on whether there are too many or too few ESLs on the shelf rail or whether the discrepancy is absent.

Preferably, the rail controller comprises at least two light emitting elements, in particular LEDs, and controls the light emittance in dependency on the supporting signal or supporting data. Here, one light emitting element is used to light up or flash if too few ESLs are attached to the rail. The other light emitting element is used to light up or flash if too many ESLs are attached to the rail. Alternatively, one of the two light emitting elements can be provided to indicate when the wrong number of ESLs are attached to the shelf rail, while the other light emitting element is provided to indicate when the correct number of ESLs are attached to the shelf rail.

The employee can also be informed about the status of the equipping of the shelf rail with the help of the ESLs directly or in addition to the aforementioned light emitting element(s). Therefore, it is of advantage that the rail controller controls the information that is displayed by the at least one of the electronic shelf labels that is attached to the shelf rail in dependency on the supporting signal or supporting data. With this measure, the already attached ESLs can be used to indicate to the employee under the control of the rail controller, for example, whether too many or too few ESLs are available on the shelf rail. The ESLs therefore receive the supporting signal or the supporting data regardless of the list of display data and process the supporting signal or data. The ESLs can display the information represented by the supporting signal or the supporting data instead of the list-elements of the list of display data or in addition to the list-elements of the list of display data. For example, the ESLs can thus display "ESLs missing" until the correct number of ESLs are present on the rail, whereupon the display is changed to the corresponding product and/or price information.

However, it is also possible for the ESLs already attached to shelf-rail to display product and/or price information before the equipping process is finalized. This embodiment may be applied in a scenario which is discussed later in details and in which the equipping order is pre-defined so that the correct list-element is always supplied to the appropriate ESL after its attachment. In this case, the ESLs can display the note "ESLs missing" in addition to the product and/or price information. The information to be displayed, in particular texts and/or images, can therefore be superimposed. The rail controller and/or the ESL can be designed to delete the support information after it has been processed. The support information is preferably deleted when the correct number of ESLs attached to the shelf rail is reached.

The provision of the display data, in particular the product and/or price information, which is stored in the list-elements of the list of display data, to the respective ESLs is discussed below.

According to a further aspect of the invention, the rail controller controls a newly attached electronic shelf label to display the information that is represented by one of the list-elements of the display data, as the action. With this measure, the time-consuming process of assigning display data to the ESLs, as it is known in prior art, is automated and performed in dependency of the detection of the attachment or the deception of the removal of an ESL.

The rail controller is therefore preferably designed to transmit a list-element of the list of display data to a newly attached ESL so that this newly attached ESL can display this data. This can be done immediately upon insertion of the ESL into the shelf rail or at a later point in time. So, it is also possible that this action is only triggered when the correct number of ESLs is present, as discussed earlier.

As already explained, the rail controller preferably creates the list of the ESLs currently attached to the shelf rail. As a function of the list of ESLs the rail controller controls the ESLs to display the information represented by the list-elements of the list of display data. Therefore, it is also possible that one element of the list of display data is intended or assigned, respectively, to several ESLs by the rail controller. In other words, several ESLs may be assigned in a group to only one list-element. This multiple list-element assignment of one list-element to multiple ESLs may be store by separate indicator data in the list of display data in an associated data structure. This situation is given when on a longer shelf several neighboring ESLs shall display identical information regarding one product or product group that is placed along a substantial length of the shelf. To cope with this situation, it is also possible that multiple list-elements of the list of display data may hold the same information about one product or one group of products. In this way multiple ESLs showing the same information may be placed in neighboring relation along this section of the shelf where the product or group of products is placed.

Beside this exception, typically a 1:1 assignment of an element of the list of ESLs to an element of the list of display data exists.

According to a preferred embodiment the list of display data represents a planned sequence of products to be placed along the shelf rail and the rail controller assigns newly attached electronic shelf labels to the respective list-element according to this planned order.

In this embodiment, per definition, the employee has to place the ESLs in a certain order, for example from right to left on the shelf rail. The first ESL attached to the shelf rail is to be assigned to the first list-element of the list of display data. The second ESL attached to the shelf rail, on the left of the first ESL, is to be assigned to the second list-element of the list of display data and so on. In this embodiment, each element of the list of ESLs is assigned to one of the list-element of the list of display data.

With this measure, the rail controller can match the ESLs with the associated display data with very little data volume and without the need for additional measurements.

As discussed earlier, it is beneficial when the rail controller deletes the stored identification data for that ESL for which the removal was detected. If the ESLs are removed by the employee in the reverse order to how they were attached, for example from left to right, the list of ESLs is always up to date and the planned sequence of products determines the assignment to the list elements of the attached ESLs to the respective list-element of the list of display data.

In general, as a particular advantage of this embodiment, the rail controller can send the correct list-element of the list of display data to the newly attached ESL immediately upon the attachment was detected. This also enables the employee to check the correspondence of the displayed content by the newly attached ESL with the product already placed on the shelf. In this example the rail controller may also indicate with the aforementioned measure that still further ESLs are missing. In particular, the rail controller does not have to count ESLs or to compare the list of ESLs with the list of display data, which eases its internal processing. As an option, the rail controller may store indicator data, which indicate that a particular list-element was already sent to an ESL.

However, the rail controller may also delay the submission of the list-elements to the ESL(s) until the number of ESLs corresponds to the number of list-elements.

According to a further embodiment of the invention the ESLs may be attached to the shelf rail in any order, i.e. in an arbitrary order in arbitrary places. Therefore according to a further aspect of the invention the list of display data represents a planned position of products to be placed along the shelf rail and the rail controller acquires a position information for a newly attached electronic shelf label, wherein the position information indicates the position of the respective electronic shelf label along the shelf rail, and assigns that list-element of the list of display data that corresponds to the acquired position of the newly attached electronic shelf label.

The planned position of a product can be represented by the position (or order of appearance) of the list-element in the list of display data or by an indicator or a value stored in the respective list-element or stored in association with it.

Both the planned position and the position information can be stored as different units or without units. For example, the position can be represented by a ranking, so that the rightmost position is represented with the number 0, the position to the left of it with the number 1, and so on. The position can also be represented, for example, by a length, such as the distance to the right edge of the shelf rail, so that the planned position of the first product can be stored as 7 cm, for example, and so on. The planned position may also define relative position between the different products or product groups or even ESLs.

Preferably, a position detection device or a position detection stage embedded in another device can be provided, which position detection device or position detection stage provides the position information. Accordingly, a position detection device is preferably provided that determines the actual position of an ESL newly attached to the shelf rail and the rail controller is designed to compare this (detected) actual position with a target position. The target position is derived from the list of display data.

According to a preferred embodiment, the acquisition of the position information is based on a remote device, in particular a camera which films the respective shelf rail and realizes the position detection device.

The ESLs can be designed to display a graphic or a code that represents the identification data of the ESL, as long as they have not received any other instructions. Such a code can be, for example, a QR code, a barcode or a code made up of letters and numbers. Such a graphic or such a code can then simply be recorded by the remote device. The position of the respective ESL can then be easily determined by known image processing methods.

The position information can also be acquired additionally or instead on the shelf rail itself.

In a further embodiment it is therefore advantageous that the acquisition of the position information is based on a coding of the shelf rail itself, which coding is detected by a newly attached electronic shelf label. The detected code or a data record that can be derived from the detected code can be transmitted to the rail controller. The rail controller, which is aware about the code or its meaning, can then determine the position of the ESL along the shelf rail based on the code or the data record. However, it is also possible that the position is already determined in the ESL, which is aware about the code or its meaning, and the information about the position is transmitted to the rail controller by the ESL. The position information that is transmitted to the rail controller therefore directly contains the position of the respective ESL or information that enables the rail controller to determine the position of the respective ESL.

In summary, the position detection stage can therefore be embedded in the ESL, and the ESL submits the position information to the rail controller. The position detection stage can also be embedded in the rail controller so that the position information is created by the rail controller itself. The position detection stage may also be embedded in a separate device installed on the rail shelf that submits position information to the rail controller.

In all embodiments the position detection device or stage is realized by hardware elements and software that is executed on a programmable computer and designed to provide the position information.

The coding of the shelf rail can be done mechanically. The shelf rail can thus have recesses of different shapes and/or sizes. The ESLs can have dedicated mechanical sensors that are designed to sense these recesses or more precise the dimensions or proportions of the recesses. Such a mechanical sensor can be a hook, for example, which still fulfills the task of fixing the ESL to the shelf rail by mechanical interaction with the recesses. Depending on the position in which the ESL is positioned along the shelf rail, the hook moves deeper or less deep into the respective recess, which means that the recess and thus the position can be deduced depending on the detected movement distance of the hook along the recess elongation until it reaches the structural boundary of the recess. After it has been successfully attached to the rail, the ESL provides not only its identification data, but also the measurement data of the mechanical sensor, i.e. sensor that determines the position of the hook, that represent the position information. This enables the rail controller to determine which ESL is attached where along the shelf rail.

According to a preferred embodiment of the invention the mechanical coding (the individual lengths of the various recesses) of the shelf rail is based on the well-known Gray Code.

The coding can also be done optically. Thus, the shelf rail can have several, in particular two-dimensional, symbols or codes or recesses of different shapes and/or sizes or even dimensions, which can be sensed by an optical sensor of the ESL.

On the one hand, the ESL can have a dedicated optical sensor, which can be a light sensitive electronical element or in particular a camera, which can capture the symbols, the codes or the recesses on the shelf rail. Also, an illumination element, for example a LED, which illuminates the optically acquirable code so that it can be acquired easier, can be foreseen at the ESL. As with the mechanical sensor, the ESL can then transmit the recorded data as the position information together with the identification data to the controller.

The ESL may also be equipped with a flight of time sensor that is designed and/or aligned to measure the distance to a neighboring element (another ESL or the rail controller) along the shelf rail. The measurements of all the ESLs installed at the shelf rail are provided to the rail controller where the measurements are evaluated and the exact positions of the respective ESLs along the shelf rail is computed.

On the other hand, the remote device realized as a camera that is installed on a celling of the shop or on the other side of a shelf aisle can also be provided here to detect the shelf rail and to determine where an ESL covers a symbol, a code or a recess along the shelf rail. This image data can be compared with older image data and/or the list of already identified ESLs in order to determine which position was newly covered or occupied. This newly covered or occupied position is therefore the position of the last ESL attached. However, based on the captured picture a picture processing software can also determine the absolute position of the newly attached ESL on a shelf rail because for example the code that is covered by the newly attached ESL is invisible in the capture picture of the shelf rail.

There can also be buttons or contacts located along the shelf rail at particular positions that close a circuit when an ESL is attached. The rail controller, which knows which button or contact is located at which position along the rail, can therefore recognize, when actuation of one of the aforementioned elements is performed, and determines the position of the newly attached ESL therefrom. The actuation of the aforementioned elements causes an individual influence of the electronic circuited and therefore represents the coding.

As will be discussed further below, the shelf rail preferably has electrical conductors in order to supply the ESLs with energy and information. These electrical conductors can also be used to determine the position of the ESLs via a resistance measurement. The controller can determine the position of the ESLs from the known electrical resistance of the ESLs and the specific resistance of the electrical conductors and/or based on empirical values. The ESL usually has at least two contacts which are intended to contact the electrical conductors so that the ESL can be supplied with energy or electrical power. To determining the position, the ESL can be designed to switch to a position-determining-mode in which the ESL has a defined resistance between the two contacts. For this purpose, the ESL can be switched, for example, in such a way that a resistor is connected between the contacts rather than the electrical system required to operate the ESL in its normal mode. After a few seconds or fractions thereof, in which the position is determined, the ESL then switches back to normal mode, in which it can draw energy from the shelf rail.

In a similar form, the position can also be determined with inductive or capacitive energy (power) and/or information transmission. In this case, conclusions can be drawn about the position of the ESL from a magnetic or an electrical field or from the change of a magnetic or an electrical field.

As mentioned, a conductor-based energy and/or information transmission has proven to be advantageous. Therefore, according to a preferred embodiment the rail controller and the electronic shelf are designed to connect to each other by electrical conductors and the electrical conductors are carried by the shelf rail.

The electrical conductors can be strips or sheets.

The shelf rail or the outermost layer of the shelf rail can also be designed like a printed circuit board and these electrical conductors are designed as a conductor track on the printed circuit board-like shelf rail.

The electrical conductors are preferably wires that are not isolated. These wires are preferably placed in grooves in the shelf rail and run along the entire length of the shelf rail where they can be contacted by contacts of the ESLs at arbitrary positions along the shelf rail.

As mentioned, the electrical conductors can be used for energy and/or information transmission as well as for position determination. In particular, the wires can be used to signal to the rail controller that an ESL has been attached or removed from the shelf rail, which can be performed either by a signal-/data-transmission or by sensing of changes in the electrical characteristics of the shelf rail bus system that is realized by the rail controller together with the conductors.

Finally, it is to mention that electronic devices discussed throughout the description of this patent application may be realized by the aid of well-known discreet and/or integrated electronics. Provided that interfaces are required the person skilled in the art will be able to select and design the appropriate interface-circuitry to enable data and/or signal communication. Programmable devices may comprise a microprocessor and some peripheral electronics. Such programmable devices may also be realized by the aid of a microcontroller or an application specific intergraded circuit (ASIC) and the like. Execution of software routines on such devices provides computer implemented functions that are discussed herein.

There are several ways in which the ESL can be attached to the shelf rail. For example, it can be attached to the shelf rail by means of a plug connection. The ESL can also be attached to the shelf rail by means of hooks. Such a hook can also lie in the shelf rail. The ESL can also be locally secured against removal by means of one or more pins. The ESL can also be attached to the shelf rail by means of an adhesive connection.

These and other aspects of the invention are obtained from the figures discussed below.

BRIEF DESCRIPTION OF THE FIGURES

The invention is explained again hereafter with reference to the attached figure and based on exemplary embodiments, which nevertheless do not limit the scope of the invention. The Figure shows in schematic fashion in.

DESCRIPTION OF THE EXEMPLARY EMBODIMENTS

Figure 1:
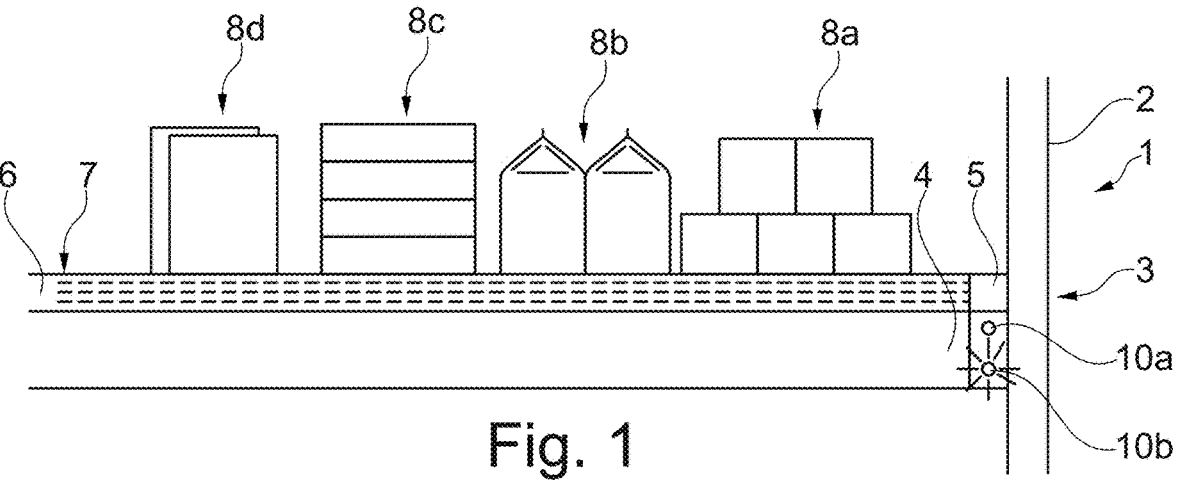
FIG. 1 a section of a shelf with a shelf rail and products placed on a shelf floor, FIGS. 2-6 the sequence of placing ESLs on a shelf rail of the shelf, FIG. 7A-7B details of the ESL, FIG. 8A the shelf rail in cross section, FIG. 8B the shelf rail in cross section with the attached ESL, FIG. 9 the back of a shelf rail, FIG. 10 the back of a shelf rail with a coding.

FIG. 1 visualizes a part of an electronic shelf label system 1, which is used to demonstrate the method according to the invention. Typically, in such a system 1 many electronic shelf labels (abbreviated as ESLs herein) are controlled by a central data management device, for example a server at the premises of a retailer or cloud-based software solution (both are not shown) to display product and/or price information for products that are placed in proximity of the respective ESL. The communication between the central data management device and the ESLs typically involves wire based and radio-based communication devices like switches, routers or access pints.

Here, the focus is given to one shelf level 3 of a shelf 2 only, because it is sufficient to explain the invention.

FIG. 1 shows a shelf rail 4 that is attached to the front edge of the shelf level 3. The shelf rail 4 carries a rail controller 5 that is located on the right-hand end of the shelf rail 4 when viewed from the front. The shelf rail 4 comprises a housing, which covers three electrical conductors 7 and the electronics (not shown in detail) of the rail controller 5. The first conductor is intended to define a ground potential, the second conductor is intended to supply power or to be used for special purpose signaling (for example the triggering of a polling sequence for all attached devices (ESLs)) and the third conductor is intended for data communication (in an highspeed synchronous bi-directional communication mode or a low-speed communication mode) and for signaling to the rail controller 5 that an attached device (ESL) has a communication demand. The electrical conductors 7 extend along substantially the entire length of the shelf rail 4 and are symbolized with dashed lines because they are installed hidden at the back of a conductor carrier 6. The electrical conductors 7 are designed as wires without isolation so that they can be contacted at the back of the conductor carrier 6 by the ESLs at any position along the shelf rail 4. The electrical conductors 7 are intended for and used to provide energy (electrical power) to the ESLs that are attached to the shelf rail 4 and to exchange data and/or signals with the ESLs that are attached to the shelf rail 4 under the control of the rail controller 5 of the shelf rail 4. The rail controller 5 together with the electrical conductors realizes a local bus system of the shelf rail, so to say a local electronical shelf rail subsystem of the ESL system 1 which is embedded into the mechanical structure of the shelf rail 4.

The shelf rail 4 as well as the ESLs 9a, 9b, 9c, 9d shown in the Figures are designed to be attached to each other, which is explained in more details by the aid of the FIG. 7A to 10.

FIG. 1 shows four groups of products 8a, 8b, 8c and 8d in the shelf level 3. The information about the products 8a, 8b, 8c and 8d and the corresponding display data are stored in a list of display data in the rail controller 5. The rail controller 5 received the list of display data from the central management device (not shown) via a radio-based communication with the afore-mentioned access point (not shown). Each list-element of the list of display data belongs to only one product group 8a to 8d.

The rightmost group of products 8a (viewed from the front) are represented by the first list-element of the list of display data. Here the second group of products 8b from the right are represented by the second list-element of the list of display data and so on. Here it is assumed that the rail-controller stores the list-elements of the list of display data in the intended sequence or the order of the product groups, according to which the product groups shall be placed on the shelf floor. Furthermore, the rail controller 5 comprises two light emitting elements designed as LEDs 10a and 10b, which are visible at the front of the housing, and which are intended to inform an employee about the current status of the placement of ESLs 9a to 9d on the shelf rail 4. The rail controller 5 is designed to control the light signalization by the LEDs 10a and 10b dependent on the status of equipping of the shelf rail 4 with ESLs 9a to 9d.

According to the present implementation of this feature the first LED 10a lights up for a pre-defined period, for example 10 seconds, when the correct number of ESLs 9a, 9b, 9c, 9d has been reached on the shelf rail 4. If too few ESLs 9a, 9b, 9c, 9d are attached to the shelf rail 4, the second LED 10b lights up continuously. If too many ESLs 9a, 9b, 9c, 9d are attached to the shelf rail 4, the second LED 10b flashes.

Because there are no ESLs 9a, 9b, 9c, 9d in FIG. 1, but groups of products 8a, 8b, 8c, 8d are already known to the rail controller 5 because it received the list of display data, the rail controller 5 generates and sends a corresponding supporting signal to the second LED 14a, which drives the LED 14a to light up continuously until the situation has changed.

Figure 2:
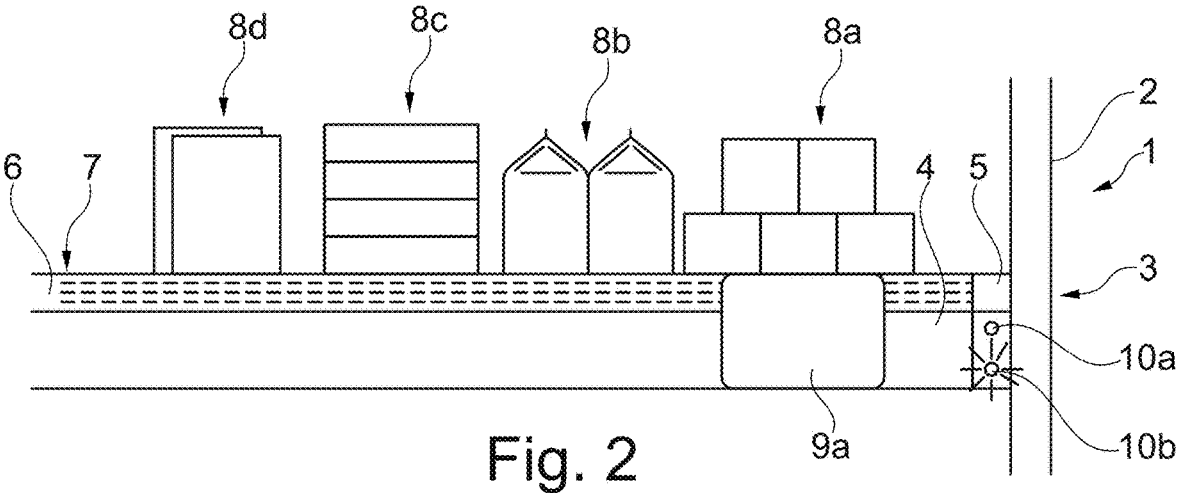

FIG. 2 shows the shelf rail 4 after the employee has attached a first ESL 9a to the shelf rail 4 below the rightmost group of products 8a. The newly installed ESL 9a signals to the rail controller 5 its existence on the shelf rail bus by influencing the power line or the signal line of the three electrical conductors 7 according to a predefined measure and then transmits its identification data to the rail controller 5 via the signal line of the shelf rail bus after the rail controller 4 triggers this data transmission. In the rail controller 5 the identification data are stored in an identification data list of ESLs (hereafter mentioned as list of ESLs), wherein the identification data of the newly attached ESL 9a represents the first element of the list of ESLs.

Because the number of elements in the list of ESLs is lower than the number of list-elements in the list of display data, i.e. there is still a discrepancy between the number of ESLs 9a that are attached to the shelf rail 4 and the number of list-elements of the list of display data, the controller continues to light the second LED 10b.

Additionally or alternatively, the rail controller 4 could send supporting data to the attached ESL 9a so that it is instructed to display a message that informs the employee how many ESLs 9a are already attached and how many should be attached to the shelf rail, so to say a discrepancy information like "¼ already installed". Also an instruction, for example "Add more ESLs" may be displayed by the ESLs. However, this is not shown further in this exemplary embodiment.

Figure 3:
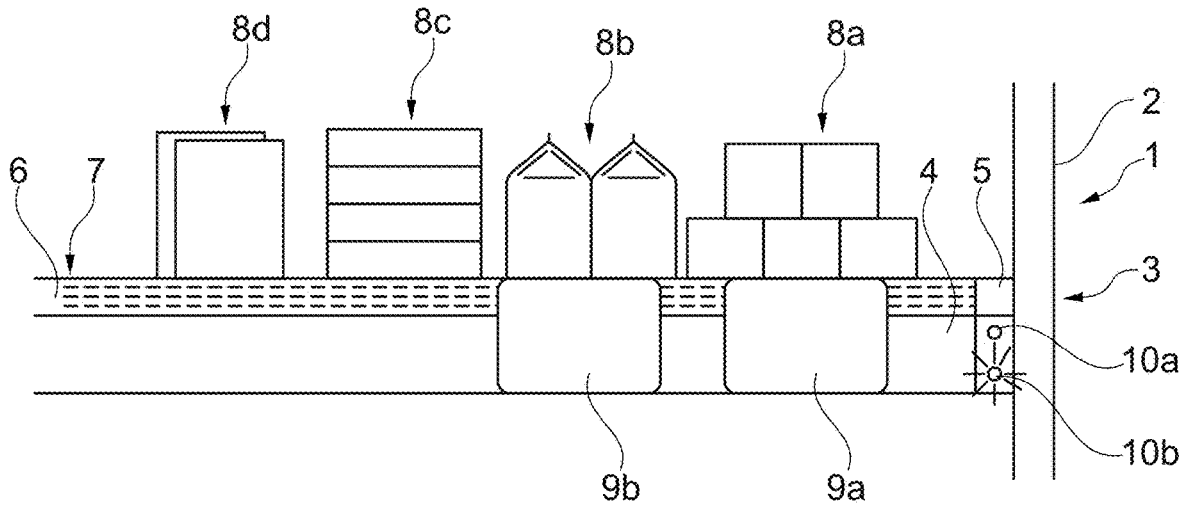

In FIG. 3, another ESL 9b was attached to the shelf rail 4. Here, too, the identification data of the new ESL 9b is acquired by the rail controller 5 as explained before and added to the list of ESLs in the rail controller 5.

Because there is still the discrepancy between the number of groups of products 8a, 8b, 8c, 8d and the number of ESL 9a, 9b, 9c, 9d attached to the shelf rail 4, the second LED 10b continues to light up.

Figures 4, 5, 6:
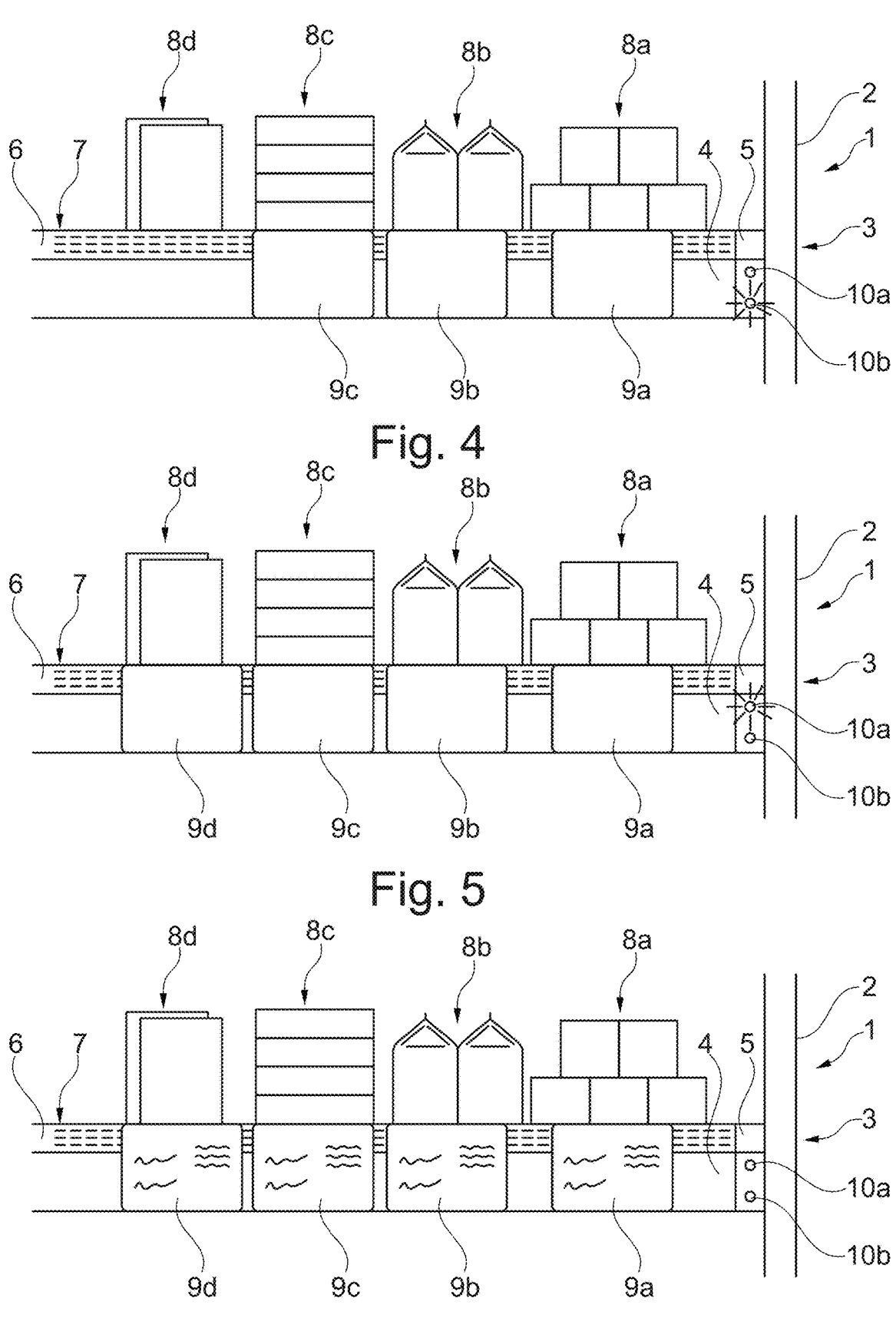

In FIG. 4, another ESL 9c was attached to the shelf rail 4 and its identification data is also included in the list of ESLs in the rail controller 5.

The discrepancy persists, which is why the second LED 10b continues to light up.

In FIG. 5, another ESL 9d is attached to the shelf rail 4 and its identification data is also included in the list of ESLs in the rail controller 5.

Now the list of ESLs has the same number of elements as the list of display data. So, there is no longer any discrepancy, which is why the rail controller 5 switches off the second LED 10b and activates the first LED 10a for the predefined period of 10 seconds. The employee can now see from the first LED 10a that lights up that the correct number of ESLs 9a, 9b, 9c, 9d has been attached to the shelf rail 4.

Because the list of display data and the list of ESLs are sorted in the same sequence or order, each list-element form the first list corresponds to the list-element of the second list, which defines the assignment of each list-element from the list of display data to each list-element of the list of ESLs 9a, 9b, 9c, 9d.

In this scenario, the first list-element of the list of display data contains product and price information of the first group of products 8a from the right. This list-element is therefore transmitted via the shelf rail bus from the rail controller 5 to the first ESL 9a from the right. This transmission is performed in an addressed communication mode which utilizes the identification data of the first ESL 9a available in the list of ESLs at the rail controller 5 to address the first ELS 9a.

The second list-element of the list of display data contains product and price information of the second group of products 8b from the right. This list-element is transmitted to the second ESL 9b from the right in the addressed communication mode.

The third list-element of the list of display data contains product and price information of the third group of products 8c from the right. This list-element is transmitted to the third ESL 9c from the right in the addressed communication mode.

Finally, it is mentioned that the fourth list-element of the list of display data contains product and price information of the fourth group of products 8d from the right. This list-element is transmitted to the fourth ESL 9d from the right in the addressed communication mode.

FIG. 6 now shows the ESLs 9a, 9b, 9c and 9d that have received the respective list-elements from the list of display data and that display the corresponding product and price information by their displays (screens 11) visible from the front view.

At this point none of the LEDs 10a, 10b are lit any more. If the employee would have continued to add ESLs, a discrepancy would have been detected by the rail controller 5 and the second LED 10b would flash until the situation changes.

If the employee would detach an ESL from the shelf rail 4, the rail controller detects this either by a signaling of the ESL to the rail controller 5 over the data or power line of the shelf rail bus or during a regular polling sequence in which the rail controller 5 checks the identity of the ESLs present on its shelf rail 4. Depending on the present equipping situation the rail controller 5 could detect a discrepancy or the absence of a discrepancy, as the case may be, and drive one of the two LEDs 10a or 10b accordingly to signal the detected situation.

FIGS. 7A and 7B show the ESL 9a as a representative for all ESLs 9a to 9d in detail. Here, FIG. 7A shows the rear side of the ESL 9a, while FIG. 7B shows a side view of the ESL 9a.

Figure 9:
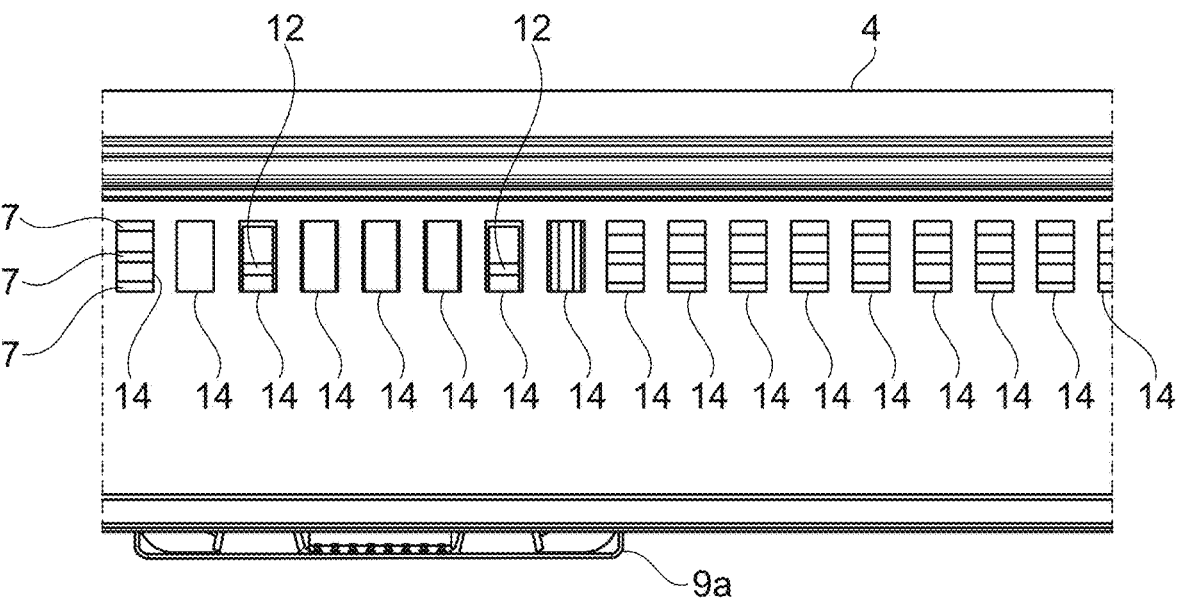
Figure 10:
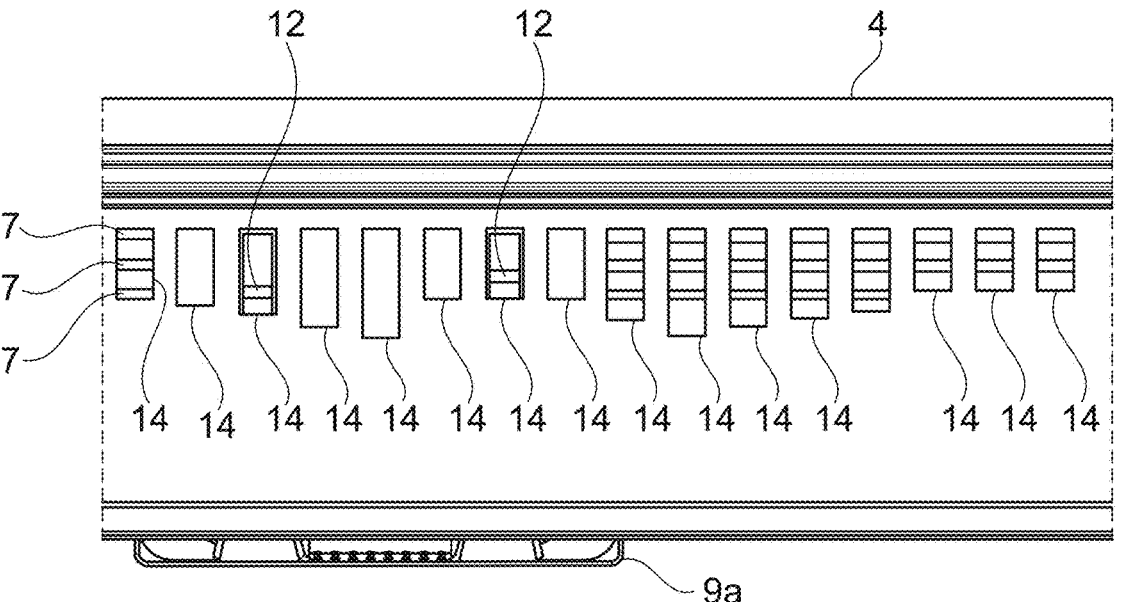

The ESL 9a comprises two hooks 12 with which it can grab into recesses 14 in the shelf rail 4, which are shown in the FIGS. 9 and 10.

The ESL 9a shown in FIGS. 7A and 78B also comprises three contacts or contact pads 13 that are intended to contact the electrical conductors 7. The contact pads 13 reach out of the housing of the ESL 9a into a gap in which the conductor carrier 6 can be inserted. The contact pads 13 are also visible through holes of the housing on the rear side. Here the contact pads 13 can easily be contacted for service or maintenance purposes.

FIG. 8A shows the shelf rail 4 in cross section.

Here, the electrical conductors 7 are encased by the plate shaped conductor carrier 6, so that only part of the cross section of the electrical conductors 7 protrudes from the cover 6 so that the conductors 7 can be contacted by the contact pads 13.

At the end of the shelf rail 4, the electrical conductors 7 are in electrical contact with the rail controller's 5 electronics, which is not shown in detail in the figures.

FIG. 8B now shows the shelf rail 4 with the attached ESL 9a. The ESLs 9a was moved from beneath the shelf rail 4 in direction of the conductor carrier 6 so that the conductor carrier 6 glided into the gap of the housing of the ESL 9a and each of the contacts peds 13 could finally contact the respective conductor 7, which establishes the electrical connection between the ESL 9a and the rail controller 5. As all ESLs 9a to 9d are connected to the only three conductors the local rail bus system utilizes a synchronous (bidirectional high speed) communication mode in which the rail controller 5 acts as the master and the ESLs 9a to 9d are the slaves. In this bidirectional communication mode, the display data and other status date are exchanged with individually addressed ESLs 9a to 9d. In addition, also an asynchronous (low speed) communication mode is provided here, in which individual ESLs 9a to 9d can communicate a communication demand for example after being attached to the shelf rail 4, so that the rail controller 5 is informed about a newly attached ESL. This asynchronous communication mode can also be used by the ESL 9a to 9d to transmit their identification data and the other parameters to the rail controller 5, so that the rail controller 5 is enabled to efficiently use the synchronous communication mode with the respective ESL 9a to 9d thereafter. This asynchronous communication mode is also used by the rail controller 5 to start a polling sequence on the local rail bus to check which of the ESLs listed in its list of ESLs is still attached to the shelf rail 4. By doing so the rail controller 5 can check for ESLs 9a to 9d which have been detached or removed, respectively, from its shelf rail 4 and in turn maintain its list of ESLs up to date.

FIG. 9 shows the rear side of the shelf rail 4 to which the ESLs 9a to 9d were attached according to the previous explanation. The ESL 9a is attached to the shelf rail 4 at arbitrary positions and no information about the exact positioning is available. In this view, the recesses 14 into which the hooks 12 of the ESL 9a grip can be seen. The electrical conductors 7 of the shelf rail 4 are visible through the recesses 14. By using such a shelf rail 4 it is of essence to attach the ESLs 9a, 9b, 9c and 9d one after the other on the shelf rail 4 from right to left, so to speak in predefined assembly or equipping direction (the predefined order) relative to the position of the rail controller 5. This is a precondition to enable the rail controller 5 to properly assign the correct display data (display information) to the ESLs for which they are intended according to the pre-defined order. If in such an embodiment one or more ESL(s) is/are removed from the shelf rail 4, and a removal order (which is the reversal order in relation to the equipping order) is not respected, it will be necessary to remove all ESLs from the shelf rail 4 so to re-establish in a new equipping process the proper relationship between ESLs attached to the shelf rail 4 and information intended to be displayed by the respective ESL.

In contrast thereto a position information that represents the actual position of the respective ESL along the shelf rail 4 can be acquired, which in turn can be used to send the appropriate list-element of the list of display data to the correct ESL, if a particular shelf rail 4 is used, as will be explained in the context of FIG. 10.

FIG. 10 shows the rear side of a coded shelf rail 4. The coding is implemented here by means of recesses 14 of different sizes (different length measured in direction perpendicular to the longitudinal extension of the shelf rail 4). For the ESL 9a that is attached to the shelf rail 4 the hooks 12 are pressed down by springs inside the ESLs 9a until the hooks 12 are in contact with the lower edge of the recesses 14. The electronics of the ESLs 9a comprises a distance sensor. The distance sensor detects how far the hook 12 has moved or what position it is in. Based on this detection for each hook 12 a distance value is determined, which represents the distance of the hook 12 from its starting position.

In summary, for each ESL 9a, 9b, 9c and 9d that is attached to the shelf rail 4 two distances values are determined, which means one for each hook 12. Because the recesses 14 in the shelf rail 4 are designed in such a way that these two distance values for each ESL can be clearly assigned to only one unambiguous position of the respective ESL 9a-9d along the shelf rail 4, this pair of distance values provides an unambiguous position information for each of the ESLs 9a to 9d that is transmitted to the rail controller 5 together with the identification data of the respective ESL 9a-9d.

Now, the rail controller 5 knows the design of the recesses 14 and the respective code that indicates the respective position and can therefore process the position information, i.e. determine the exact position of the ESLs 9a-9d on the shelf rail 4. Based on to the derived exact position for each ESL 9a-9d the rail controller 5 transmits the appropriate list element of display data to the correct ESL 9a to 9d. In this embodiment the list of display data or associated data may also comprise range information that indicates the accepted positioning range along the shelf rail 4 for the individual ESLs 9a to 9d, so that the ESLs 9a-9d do not have to be placed at an exact position but rather can be placed within a pre-defined position range along the shelf rail 4. This further eases the shelf rail equipping process.

Finally, let it be noted once again that the figures described in detail above only involve exemplary embodiments, which the expert can modify in a wide variety of ways without departing from the area of the invention. For the sake of completeness, let it also be stated that use of the indeterminate article "a" or "an" does not mean that the respective features cannot be present multiple times.

The invention claimed is:

1. A method of controlling an electronic shelf label that is attached to a shelf rail at a position along the shelf rail and controlled by a local rail controller at the shelf rail, wherein the rail controller stores a list of display data, wherein an element of the list of display data is intended to be submitted to an electronic shelf label and represents the information that shall be displayed there, and detects the attachment of an electronic shelf label to the shelf rail or the removal of an electronic shelf label from the shelf rail, and, based on the detection of the attachment or the detection of the removal of an electronic shelf label, triggers an action under consideration of the list of display data, wherein the rail controller is physically attached to the shelf rail and separate from the electronic shelf label.

2. The method according to claim 1, wherein the rail controller acquires identification data from each electronic shelf label for which the rail controller detected the attachment and stores the acquired identification data.

3. The method according to claim 2, wherein the rail controller deletes the stored identification data for that electronic shelf label for which the removal was detected.

4. The method according to claim 1, wherein based on the detected attachment or detected removal a discrepancy between the number of electronic shelf labels that are attached to the shelf rail and the number of list-elements of the list of display data is identified.

5. The method according to claim 4, wherein the rail controller controls the timing and/or content of the information that is displayed by the electronic shelf label in dependency of the existence or absence of the discrepancy.

6. The method according to claim 5, wherein, as the action, the rail controller controls all attached electronic shelf labels to display the information represented by the assigned list-element of the list of display data only after the discrepancy has been resolved.

7. The method according to claim 4, wherein the rail controller generates as the action a supporting signal or supporting data representing a supporting information in dependence on the identified discrepancy.

8. The method according to claim 7, wherein the rail controller comprises a light emitting element and controls the light emittance in dependency on the supporting signal or supporting data.

9. The method according to claim 7, wherein the rail controller controls the information that is displayed by the at least one of the electronic shelf labels that is attached to the shelf rail in dependency on the supporting signal or supporting data.

10. The method according to claim 1, wherein as the action the rail controller controls a newly attached electronic shelf label to display the information that is represented by one of the list-elements of the display data.

11. The method according to claim 10, wherein the list of display data represents a planned sequence of products to be placed along the shelf rail and the rail controller assigns newly attached electronic shelf labels to the respective list-element according to this planned sequence.

12. The method according to claim 10, wherein the list of display data represents a planned position of products to be placed along the shelf rail and the rail controller acquires a position information for a newly attached electronic shelf label, wherein the position information indicates the position of the respective electronic shelf label along the shelf rail, and the rail controller assigns that list-element of the list of display data to the newly attached electronic shelf label, which list-element corresponds to the acquired position of the newly attached electronic shelf label.

13. The method according to claim 12, wherein the acquisition of the position information is based on a remote device.

14. The method according to claim 12, wherein the acquisition of the position information is based on a coding of the shelf rail itself, which coding is detected by a newly attached electronic shelf label.

15. The method according to claim 1, wherein the rail controller and the electronic shelf are designed to connect to each other by electrical conductors and the electrical conductors are carried by the shelf rail.

16. The method according to claim 1, wherein the rail controller is a first rail controller among a plurality of rail controllers and the shelf rail is a first shelf rail among a plurality of shelf rails, and the plurality of rail controllers are each physically attached to different ones of the plurality of shelf rails.

17. The method according to claim 8, wherein the light emitting element is a light emitting diode (LED).

18. The method according to claim 13, wherein the remote device is a camera that films the respective shelf rail.

* * * * *